United States Patent
Cimini, Jr. et al.

(10) Patent No.: US 7,769,043 B2
(45) Date of Patent: Aug. 3, 2010

(54) PACKET SHAPING FOR MIXED RATE 802.11 WIRELESS NETWORKS

(75) Inventors: Leonard Joseph Cimini, Jr., Howell, NJ (US); Zoran Kostic, Holmdel, NJ (US); Kin K Leung, Edison, NJ (US); Hujun Yin, Bethlehem, PA (US)

(73) Assignee: AT&T Corp., New York, NY (US)

( * ) Notice: Subject to any disclaimer, the term of this patent is extended or adjusted under 35 U.S.C. 154(b) by 323 days.

(21) Appl. No.: 11/973,435

(22) Filed: Oct. 9, 2007

(65) Prior Publication Data

US 2008/0259792 A1    Oct. 23, 2008

Related U.S. Application Data

(63) Continuation of application No. 10/294,928, filed on Nov. 14, 2002, now Pat. No. 7,301,965.

(60) Provisional application No. 60/332,958, filed on Nov. 19, 2001.

(51) Int. Cl.
*H04J 3/16* (2006.01)
(52) U.S. Cl. .................. 370/470; 370/455; 370/468; 370/338
(58) Field of Classification Search .................. None
See application file for complete search history.

(56) References Cited

U.S. PATENT DOCUMENTS 6,522,650 B1 * 2/2003 Yonge et al. ............... 370/390
7,136,392 B2 * 11/2006 Wentink .................... 370/445

* cited by examiner

*Primary Examiner*—Phuc Tran

(57) ABSTRACT

A method of shaping data packet transmissions by nodes in a wireless network is presented. Each node sets a maximum limit for MAC service data unit size based on data rate so that maximum transmission times for data packet transmissions by all of the nodes are approximately the same.

7 Claims, 12 Drawing Sheets

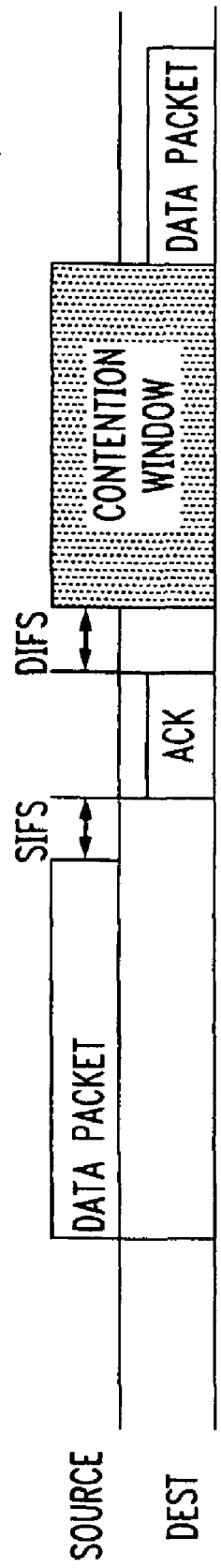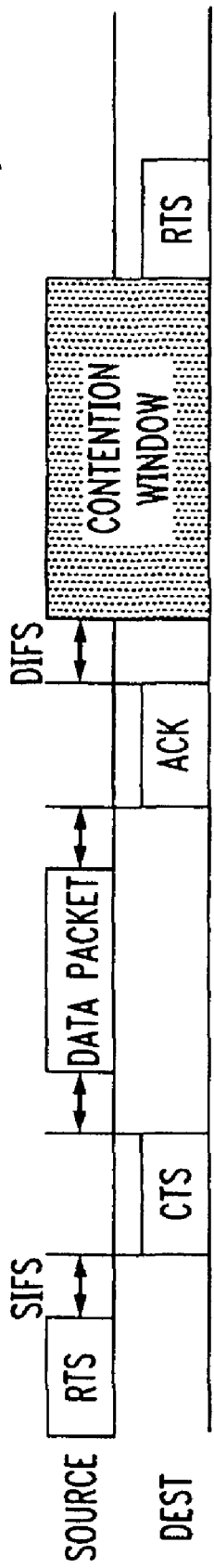

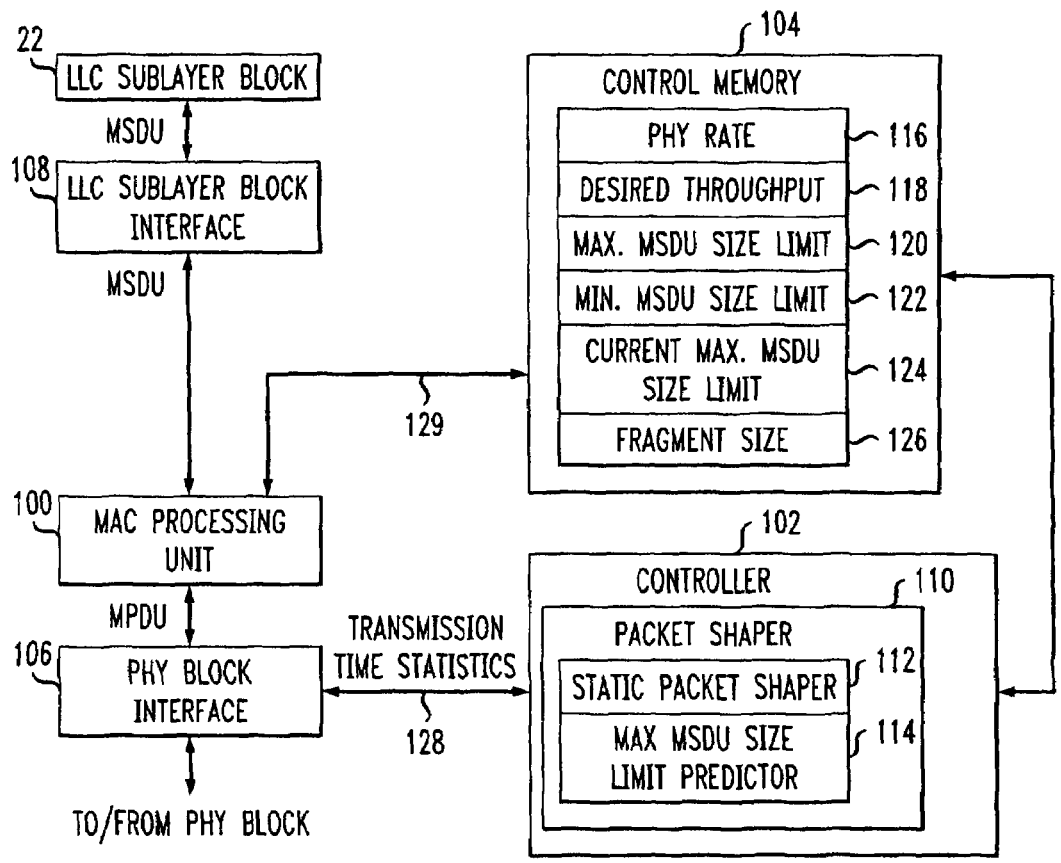
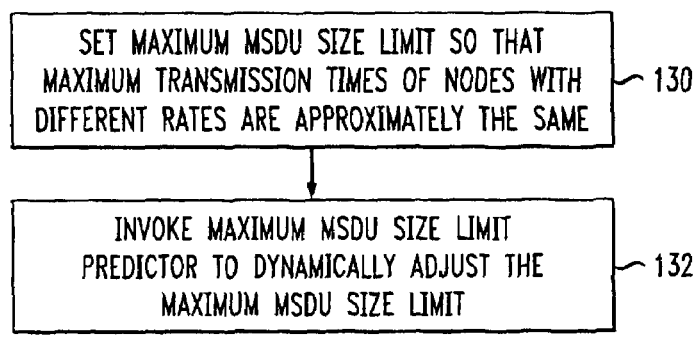

PACKET SHAPING FOR MIXED RATE 802.11 WIRELESS NETWORKS

CROSS REFERENCE TO RELATED APPLICATIONS

This application is a continuation of U.S. patent application Ser. No. 10/294,928, filed Nov. 14, 2002 and issued on Nov. 27, 2007 as U.S. Pat. No. 7,301,965, which claims the benefit of U.S. Provisional Patent Application Ser. No. 60/332,958, filed Nov. 19, 2001, the contents of which are incorporated herein by reference in their entirety for all purposes.

BACKGROUND

The invention relates generally to packet shaping for transmissions in an IEEE 802.11 network.

A wireless local area network (WLAN) based on the IEEE 802.11 standard supports variable packet length. When such a network supports multi-rate communications, even packets with the same size may require different transmit durations at different rate modes. As a result, a node operating at a lower data rate may require a longer transmission time than higher rate nodes in order to transmit the same amount of information. The IEEE 802.11a standard sets a uniform maximum packet length limit of 4095 bytes regardless of the data rate, but allows PHY mode rates to range from 6 Mbps to 54 Mbps. Thus, the time that a 6 Mbps node occupies the network channel may be up to nine times that of a faster 54 Mbps node. This type of scenario is undesirable because the presence of low data rate nodes significantly reduces overall network capacity.

SUMMARY

The present invention features a method and corresponding apparatus for shaping data packets for transmission by node in a wireless network of nodes. The method sets a maximum limit for MAC service data unit size (MSDU) based on data rate so that maximum transmission time for data packet transmission by each of the nodes is approximately the same.

Particular implementations of the invention may provide one or more of the following advantages. Because the packet shaping mechanism sets a maximum MSDU size limit based on node data rate so that the maximum transmission time of all the nodes is the same, network channel resources are equally distributed among all the nodes. By applying different limits in such a manner, it is possible to improve network capacity when there are mixed rate nodes in the network. In addition, the maximum MSDU length limit can be adjusted to take into account ongoing network activity, e.g., network nodes can adjust the length limits so that maximum transmission time of all nodes converges to the same value when network load is high while increasing when network load is light. Rate constraints of each node can also considered. That is, the length limits can be adjusted to guarantee a minimum rate for each node. The packet shaping mechanism can also be used to provide different rates to same data rate nodes.

Other features and advantages of the invention will be apparent from the following detailed description and from the claims.

BRIEF DESCRIPTION OF THE DRAWINGS

FIGS. 4A and 4B are timing diagrams illustrating operation according to basic Distributed Coordination Function (DCF) and DCF with Request-to-Send (RTS)/Clear-to-Send (CTS), respectively.

FIG. 7 is a block diagram of the data link layer functional block (shown in FIG. 2) that includes a packet-shaping controller.

FIG. 8 is a flow diagram of the operational flow of a static packet shaper (of the packet shaping controller shown in FIG. 7) to set a maximum MSDU size limit.

Like reference numerals will be used to represent like elements.

DETAILED DESCRIPTION

Figure 1A:
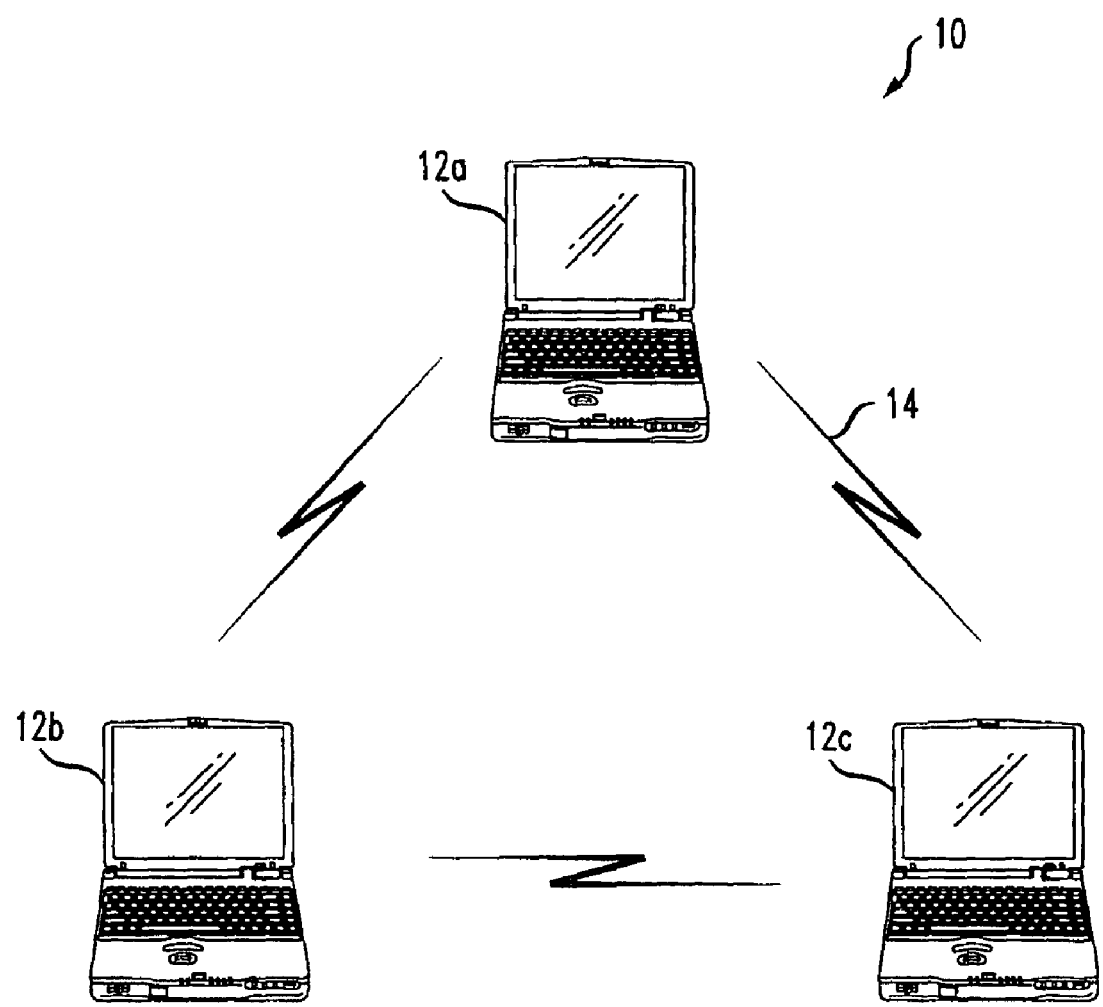
FIGS. 1A and 1B are diagrams of exemplary IEEE 802.11 wireless networks with network nodes arranged to form an infrastructure basic service set and an independent basic service set, respectively, the nodes configured to employ data rate dependent packet shaping.

Referring to FIG. 1, a wireless network 10 includes two or more wireless network nodes 12, e.g., stations (or terminals) 12a, 12b and 12c, arranged in a peer-to-peer configuration referred to as an independent basis service set (IBSS). During a communication between at least two of the network nodes 12 over a wireless transmission medium (indicated by reference numeral 14), a first network node, for example, network node 12a, serves as a transmitting network node (or transmitter) and at least one second network node, for example, network node 12b, serves as a receiving network node (or receiver).

Figure 1B:
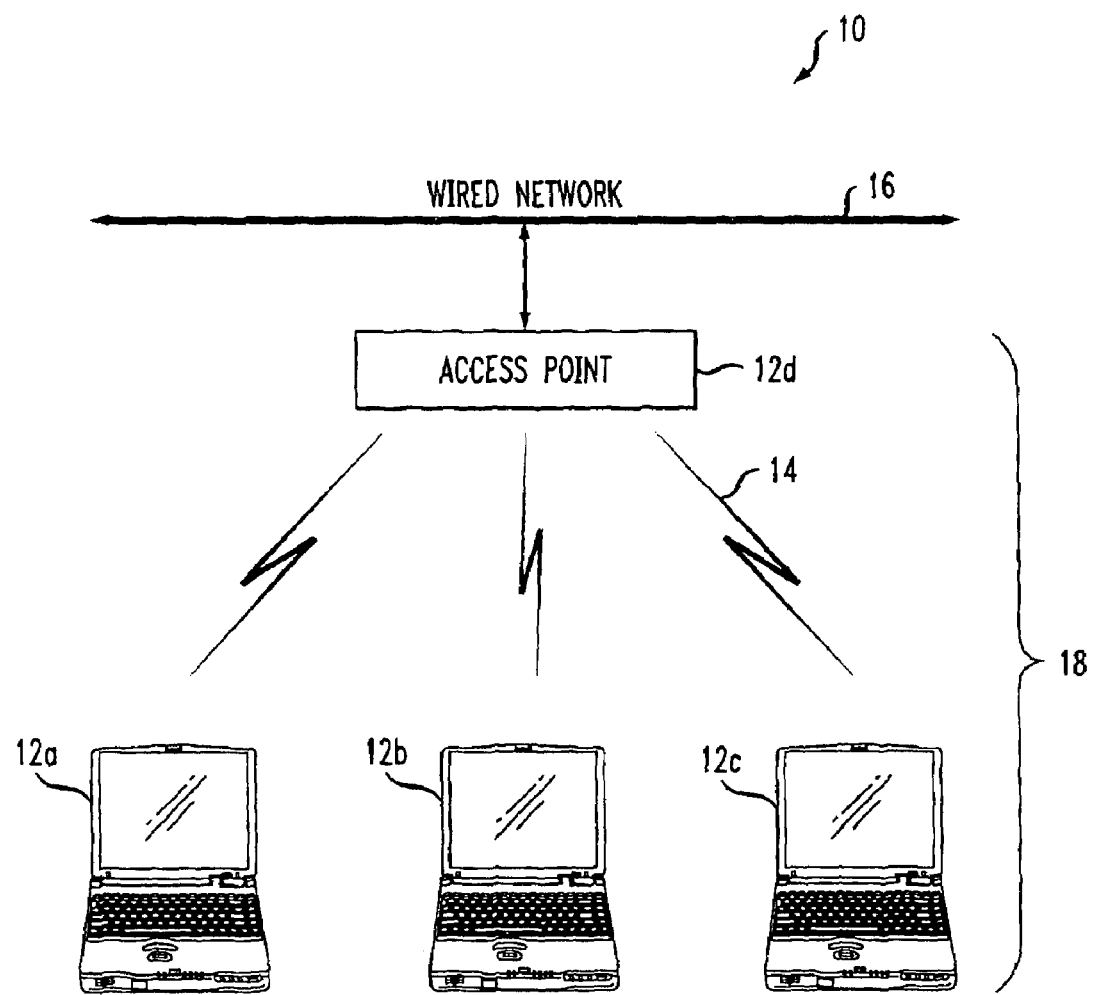

In another embodiment of the wireless network 10, as shown in FIG. 1B, the nodes 12 can include a wireless access point 12d that couples the stations 12a-12c to a wired network (e.g., a Local Area Network or "LAN") 16. In this arrangement, the stations 12a-12c are associated with the AP 12d to form an infrastructure basic service set (BSS) 18. The AP 12d and stations 12a-12c served by the AP 12d in a given infrastructure BSS (or cell) 18 communicate with each over a common channel that is assigned to the AP. Although not shown, it will be appreciated that the wireless network 10 could include one or more of both types of configurations, that is, the IBSS and infrastructure BSS configurations.

In the embodiments described herein, the nodes in the wireless network 10 communicate with each other according to the wireless protocol provided by the IEEE 802.11 standard. The IEEE 802.11 standard specifies the medium access control (MAC) and the physical (PHY) characteristics for WLANs. The IEEE 802.11 standard is defined in International Standard ISO/IEC 8802-111, "Information Technology-Telecommunications and Information Exchange Area Networks," 1999 Edition, which is hereby incorporated by reference in its entirety.

In one embodiment, in particular, the network nodes 12 operate according to different data rates. In accordance with the present invention, therefore, the network 10 employs a packet-shaping mechanism that ensures that all of the network nodes 12 have a transmission time that is approximately the same, as will be described.

Figure 2:
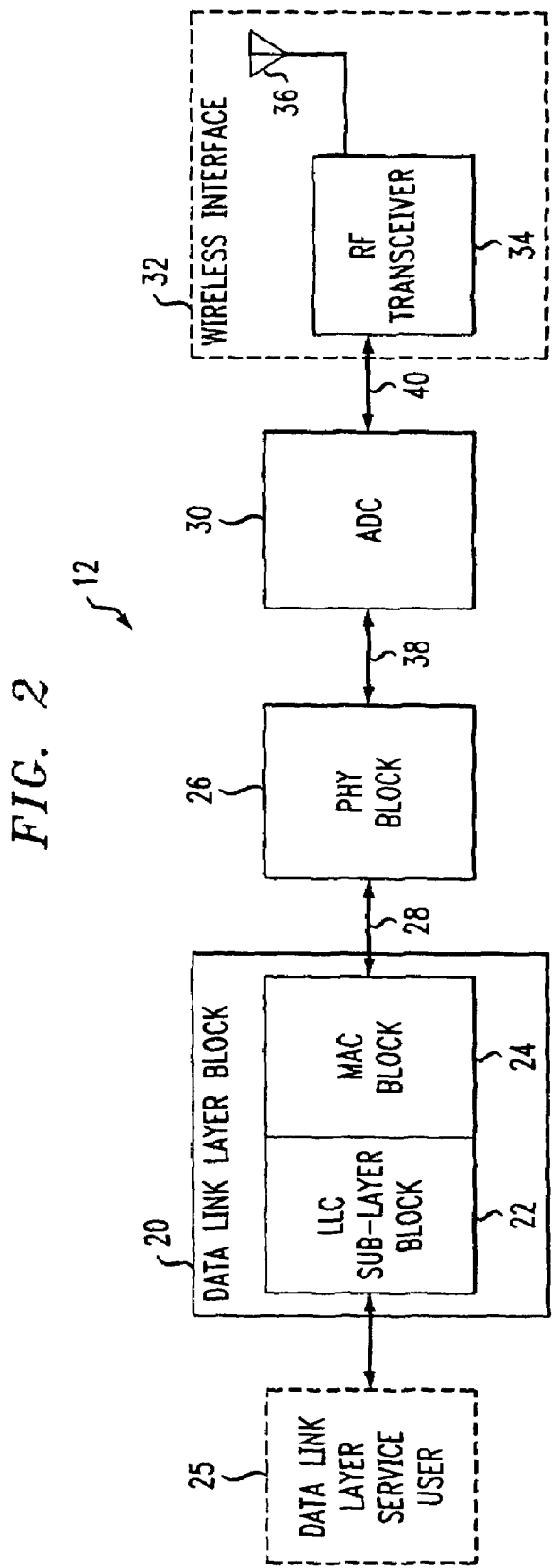
FIG. 2 is a block diagram of an exemplary one of the network nodes (shown in FIGS. 1A-1B).

Referring to FIG. 2, an exemplary network node 12 includes a number of different functional blocks. Those functional blocks include a data link layer block 20, including an LLC sublayer block 22 and a media access control sublayer (MAC) block 24, which connects to a data link layer service user (indicated in dashed lines by reference numeral 25), a physical layer (PHY) block 26 connected to the MAC block 24 by a MAC-to-PHY I/O bus 28, an analog front end unit or ADC 30 for digital to analog conversion and a wireless interface 32. The wireless interface 32 includes an RF transceiver 34 and an antenna 36 coupled to the RF transceiver 34. The ADC unit 30 connects to the PHY block 26 by ADC I/O lines 38, as well as connects to the RF transceiver 34 by an ADC-to-transceiver interface 40. Typically, each RF transceiver 34 includes its own receiver for receiving wireless RF communications from a terminal, a transmitter for transmitting wireless RF communications to a terminal, and a microprocessor to control the transceiver. Wireless communications are received and transmitted by each RF transceiver 34 via its respective antenna 36. Each transceiver 34 and antenna 36 may be conventional in configuration and operation.

The network node 12 can include the data link layer service user 25 or be coupled to an external data link layer service user 25. The data link layer service user 25 is intended to represent any device that uses the blocks 20, 26, 30 and 32 to communicate with any other node on the wireless network 10, or other network to which the wireless network 10 may be connected. The blocks 20, 26, 30, 32 and (optionally) 25 may reside in a single system "box", for example, a desktop computer with a built-in network interface, or may reside in separate boxes, e.g., blocks 24, 26, 30 and 32 could reside in a separate network adapter that connects to a host. The functionality of blocks 24 and 26 may be integrated in a single MAC/PHY transceiver chip. Thus, each node 12 represents any combination of hardware, software and firmware that appears to other nodes as a single functional and addressable entity on the network.

Preferably, the data link layer and PHY blocks conform to the Open System Interconnect (OSI) Model. The data link layer block 20, in particular, the MAC block 24, performs data encapsulation/decapsulation, as well as media access management for transmit (TX) and receive (RX) functions. Preferably, the data link layer block 20 employs a collision avoidance medium access control scheme like carrier sense multiple access with collision avoidance (CSMA/CA) as described by the above-referenced IEEE 802.11 standard. The MAC block 24 also provides Automatic Repeat request (ARQ) protocol support. The PHY block 26 performs transmit encoding and receive decoding, modulation/demodulation, among other functions. In the described embodiment, the operation of the PHY block 26 conforms to the IEEE 802.11a standard.

The unit of communication exchanged between nodes over the wireless medium 14 is in the form of a PHY protocol data unit ("PPDU"). The PPDU may include a payload, i.e., the MAC frame or PDU (MPDU), in conjunction with a delimiter of preamble and frame control information. A MAC Service Data Unit (MSDU) refers to any information that the MAC block has been tasked to transport by upper protocol layers (e.g., OSI layers to which the OSI MAC layer provides services), along with any management information supplied by the MAC block.

Figure 3:
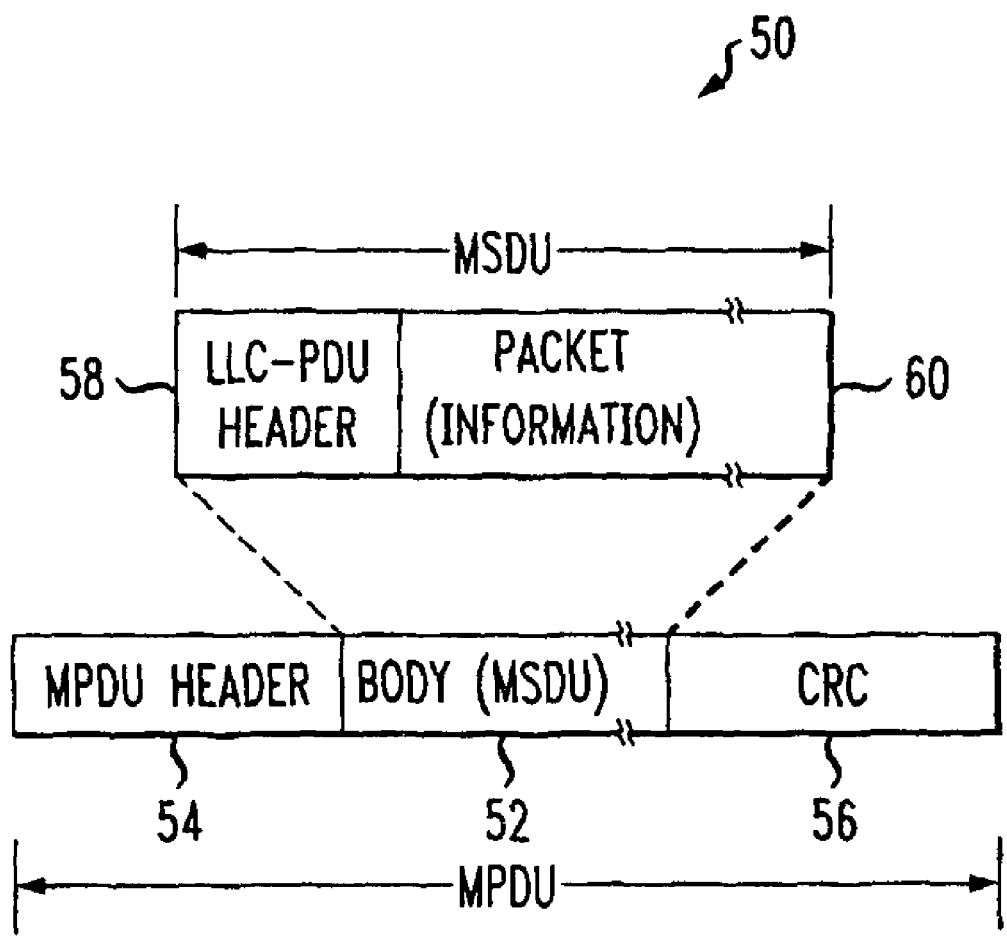
FIG. 3 is an exemplary format of a MAC Protocol Data Unit (PDU).

FIG. 3 shows a format of an MPDU 50, which is provided by the MAC block 24 to the PHY block 26. The MPDU 50 includes a variable length body 52 encapsulated by an MPDU header 54 and a Cyclic Redundancy Check (CRC) (or Frame Check Sequence) 56. The body 52 corresponds to the MSDU, and includes the header of the LLC PDU 58 and a packet (information or user data) 60. As will be discussed later with reference to FIGS. 11 and 12, the MPDU 50 may have the capacity to contain an entire MSDU 52 or only a fragment of the MSDU 52.

Preferably, the MAC block 24 supports standard MAC functions, such as framing, as well as ensures Quality of Service and provides for reliable frame delivery through a number of different mechanisms. Also, ARQ is used to ensure delivery for unicast transmissions. A correctly addressed frame with a valid PHY frame Check Sequence causes the receiver to transmit a positive acknowledgment (or "ACK") response to the originator. Transmitting nodes attempt error recovery by retransmitting frames that are known or are inferred to have failed. Failures occur due to collisions or bad channel conditions, or lack of sufficient resources at the receiver. Transmissions are known to have failed if a "NACK" (in the case of bad channel conditions) or "FAIL" (in the case of insufficient resources) response is received. Transmissions are inferred to have failed for some other reason (for example, due to collisions) if no response, that is, no ACK, NACK, FAIL or other defined response types not discussed herein, is received when one is expected.

The IEEE 802.11 standard provides a detailed medium access control (MAC) and physical layer (PHY) specification for WLANs. The IEEE 802.11a PHY has been developed to extend the existing IEEE 802.11 standard in the 5 GHz U-NII bands. The 802.11a PHY is based on Orthogonal Frequency Domain Multiplexing (OFDM) radio, which provides eight different PHY modes with data rates ranging from 6 Mbps to 54 Mbps. In addition to the use of multiple modulation schemes, convolutional codes with variable rates are adopted to improve the frame transmission reliability as well as the data rate.

In the IEEE 802.11 MAC, the fundamental mechanism to access the medium is called Distributed Coordination Function (DCF). It achieves medium sharing through the use of CSMA/CA with random backoff. The nodes 12 follow two medium access rules. First, a node is allowed to transmit only if its carrier sense mechanism determines that the medium has been idle for at least the distributed interframe space (DIFS) time. Second, the node selects a random backoff interval (contention window) after access deferral or prior to attempting to transmit again immediately after a successful transmission.

Referring to FIGS. 4A and 4B, the DCF employs two types of mechanisms for packet transmission. One mechanism is a basic DCF access scheme and uses a two-way handshaking technique 70, shown in FIG. 4A. This technique uses an immediate transmission of a positive acknowledgement (ACK) by the destination node upon successful reception of a packet from sender. Referring to FIG. 4B, in addition to the basic access, an optional mechanism that uses a four-way handshaking technique 80 referred to as DCF with Request-to-Send (RTS)/Clear-to-Send (CTS) has been standardized. Before transmitting a PPDU with packet data (referred to herein as a data packet), a node operating in RTS/CTS mode "reserves" the channel by sending a special RTS frame. The destination, having received the RTS and waited a short interframe spacing (SIFS) time, acknowledges the receipt of an RTS by sending back a CTS frame. A data packet transmission and ACK follow, with the appropriate SIPS (as shown in FIG. 4B). The RTS/CTS scheme increases network performance by reducing the duration of a collision when long messages are transmitted. Also, the RTS/CTS scheme is suited to combat the well-known "hidden node" problem. The RTS/CTS is a natural choice for adaptive coding/modulation because the RTS/CTS pair can exchange channel information before the data packet transmission begins so that accurate rate adaptation can occur.

The DCF adopts an exponential backoff scheme. At each packet transmission, the backoff time is uniformly chosen in the range (0, w−1), where the value "w" relates to a contention window and depends on the number of transmission failed for the packet. At the first transmission attempt, w is set equal to a minimum contention window value "aCWmin". After each unsuccessful transmission, w is doubled, up to a maximum value "aCWmax". The backoff timer is decremented as long as the channel is sensed idle, "frozen" when a transmission is detected on the channel, and reactivated when the channel is sensed idle again for more than a DIFS. The node transmits when the backoff time reaches zero. As can be seen from FIGS. 4A-4B, in order to transmit a data packet successfully, some overheads such as PHY overhead, ACK and backoff are added. As the data rate increases, such overhead is relatively constant. Thus, the overhead becomes significant for high rate links.

Figure 5:
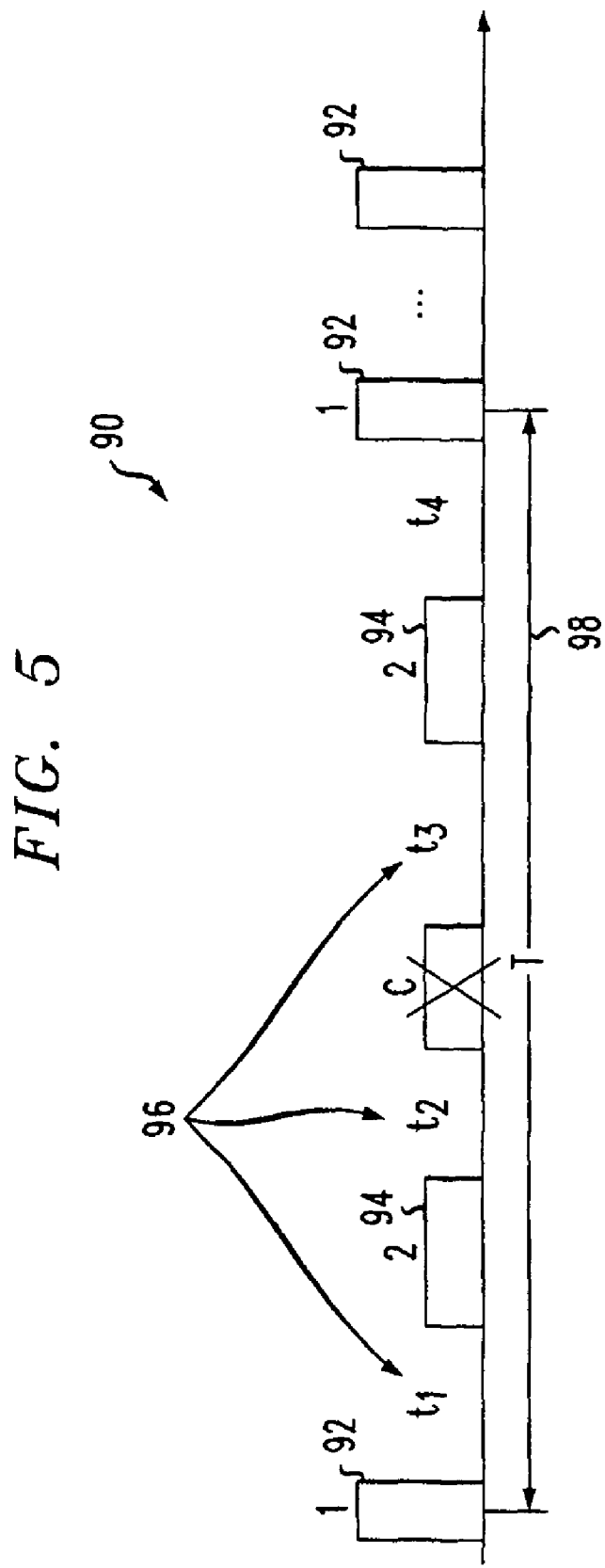
FIG. 5 is a depiction of transmission cycles of two network nodes of the wireless network.

Referring now to FIG. 5, to evaluate the effect of such overhead on link adaptation, IEEE 802.11 MAC performance is considered for a case of two nodes (nodes 1 and 2) contending for the channel, indicated by reference numeral 90. The two nodes alternatively occupy the medium during node 1 transmissions 92 and node 2 transmissions 94 with some idle time 96 in between for random backoff and occasional collisions (for example, collision "C"). A single transmission cycle for node 1 is indicated by "T" (reference numeral 98). The data rates of the two nodes are assumed to be R1 and R2 and the data packet size of both nodes are assumed to be the same (b1=b2). The expected number of successful transmissions between two collisions is denoted by $L_0$. The symbols $t_1, t_2, t_c, t_H,$ and $t_{avg}$ denote the node 1 transmission time, node 2 transmission time, collision time, overhead time and average waiting time, respectively. The total cycle T is:

$$T=(L_0+1)t_{avg}+t_c+(L_0/2)(t_1+t_2) \quad \text{Eq. (1)}$$

The bandwidth occupied by each node is:

$$B_i=(L_0 t_i)/2T, \quad \text{Eq. (2)}$$

$$B_1/B_2=[t_1/t_2=t_H+(B_1/R_1)]/[t_H+(b_2/R_2)]\approx R_2 R_1. \quad \text{Eq. (3)}$$

Thus, the bandwidth effectively used by each node is inversely proportional to its data rate. Given that the IEEE 802.11a rate difference could be up to 9 times, the low rate node can occupy as much as 9 times the bandwidth of the high rate node, thus reducing overall system capacity. The gain of rate distribution is equally distributed among all the users. When the network is low rate dominate, and if some users switch to a higher rate, all the users have their throughput increased. However, the users switched to higher rates themselves do not have significant gain over the rate adaptation. On the other hand, if the network is high rate dominate, and if some users switch to a lower rate, all users' performance degrade while the low rate users do not lose much performance themselves. The property still holds for the networks with more than two nodes.

As discussed earlier, to transmit packets with the same length, the low rate nodes tend to consume more transmission time than the high rate nodes. The amount of time consumed is approximately inversely proportional to the transmission rate. As the IEEE 802.11 DCF MAC essentially gives the same probability of transmission to each node regardless of its transmission rate, the amount of bandwidth/time occupied by each node is therefore inversely proportional to its transmission rate. Although each node receives the same quality of service, there may be some undesirable side effects. For example, if all the nodes are uniformly operating at a high rate mode (e.g. 48 Mbps), the network can support a large number of nodes. If some low rate (6 Mbps) nodes are admitted into the network, however, each will consume eight times of bandwidth than the high rate nodes. This significantly reduces the number of high rate nodes that the network can support.

It is possible to set different maximum packet size limits for each PHY rate mode. In a standard or conventional approach, the packet size limits are the same for all the PHY modes. Assuming that each node may require a minimum service rate, the standard approach gives the same rate for all of the nodes and would limit the system capacity. If the network has two types of nodes $r_1$ and $r_2$ ($r_1 > r_2$) with rate restrictions $R_1, R_2$ and the total bandwidth is $B_0$, the number of nodes that can be accommodated in the system N1, N2 must satisfy $$(r_1 r_2 B_0)/(r_2 N_1 + r_1 N_2) \geq R_1 \text{ and } (r_1 r_2 B_0)/(r_2 N_1 + r_1 N_2) \geq R_2 \quad \text{Eq. (4)}$$

so $$r_2 N_1 + r_1 N_2 \leq r_1 r_2 B_0 \min(1/R_1, 1/R_2). \quad \text{Eq. (5)}$$

For a modified, rate-dependent packet shaping approach, $$R_1 B_0/(N_1+N_2) \geq R_1 \text{ and } r_2 B_0/(N_1+N_2) \geq R_2 \quad \text{Eq. (6)}$$

so, $$N_1+N_2 \leq B_0 \min(r_1/R_1, r_2/R_2). \quad \text{Eq. (7)}$$

Assuming that the high rate nodes operate at 48 Mbps and the low rate nodes operate at 6 Mbps, and also assuming that the rate requirements for high rate nodes are 1 Mbps, the number of high rate nodes that can be accommodated by the standard approach is significantly reduced if there are heavily loaded low rate nodes in the network. In the packing shaping approach, therefore, the packet size is chosen to be inversely proportional to the node data rate, thus greatly increasing the capacity for high rate nodes with a given rate constraint. Of course, the low rate nodes may subject to lower rate comparing with the standard approach.

Figure 6:
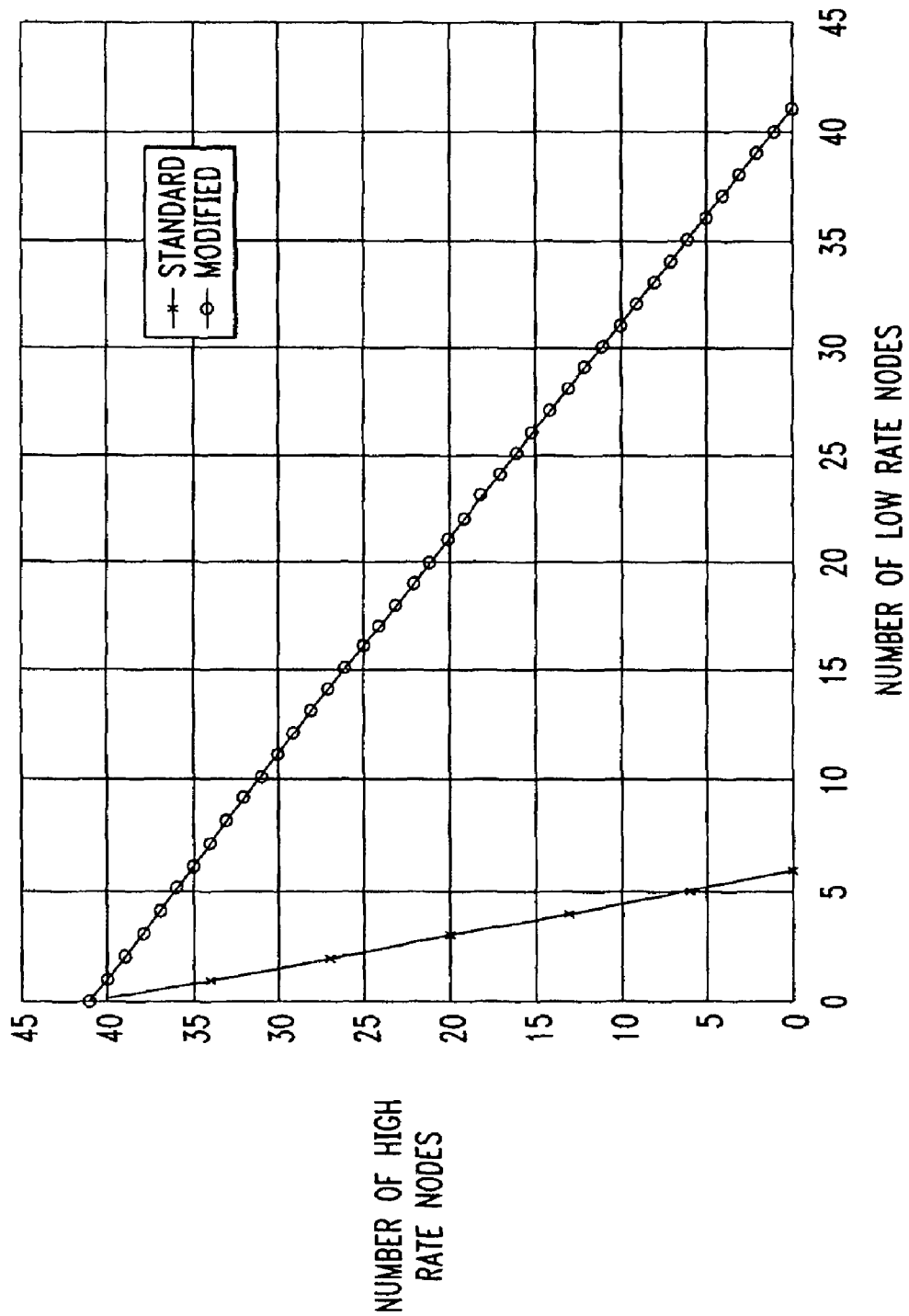
FIG. 6 is a graphical depiction of network capacity for high rate network nodes with rate constraint.

FIG. 6 shows network capacity for high and low rate nodes with some rate restrictions using both the standard and packet shaping approach. The capacity region is determined by min ($r_1/R_1$, $r_2/R_2$). If both node types R1, R2 have the same rate requirements, the packet shaping does not work as well as than the standard approach. In most practical scenarios however, the rate requirement is proportional to operating data rate and so the packet shaping provides the best capacity.

Referring to FIG. 7, an architectural representation of the data link layer block 20 configured for the packet shaping capability, as discussed earlier, is shown. The block 20 includes a MAC processing unit 100 coupled to a controller 102 and a control memory 104. The block 20 further includes a PHY interface 106 for coupling to the PHY block 26 and an LLC sublayer block interface 108 for coupling the MAC processing unit 100 to the LLC sublayer block 22. Collectively, units 100, 102, 104, 106 and 108 form the MAC block 24 (from FIG. 2).

The MAC processing unit 100 performs all of the functions necessary to prepare MPDUs for MSDUs received from the LLC sublayer block 22, as well as MAC level transmit and receive operations. The controller 102 includes a packer shaper or packet shaping process 110. The packet shaper 110 includes a static packet shaper 112 and, optionally, a dynamically adjusting packet shaper, indicated as a maximum MSDU size limit predictor (hereinafter, simply "predictor") 114. To support the packet shaping optimization, the controller 102 maintains in the control memory 104 the following parameters: PHY rate 116; desired throughput 118; a maximum MSDU size limit 120, a minimum MSDU size limit 122; and a current maximum MSDU size limit 124. As mentioned earlier, the MAC block 24 can perform fragmentation. Thus, the control memory 104 stores a fragment size (threshold) 126 as well. The various parameters of the control memory 104 are either set by configuration information at boot time, or are set by the packet shaper 110.

Other control information that does not directly pertain to packet shaping control, for example, control information related to channel access contention, has been omitted herein. Preferably, channel access contention, and other aspects of operation not described herein, may be implemented according to techniques described in the above-referenced IEEE 802.11 standard.

The packet shaper 110 sets the maximum MSDU size (or length) limit based on the node operating data rate (PHY rate 116) so that the maximum packet transmission times of all nodes are the same, thus ensuring that network resources are equally distributed among all the nodes. Applying different maximum length limits in this manner improves the network capacity when there are nodes operating at different data rates present in the network.

Preferably, the packet shaper 110 adapts the length limit setting based on not only the PHY rate (static shaping) but also the network activity. To support the dynamically adjusting mode of operation, therefore, the controller 102 monitors (via the PHY block interface 106) the wireless medium for network activity and collects transmission time statistics (of ongoing traffic), indicated by reference numeral 128. With this information and the control information stored in the control memory 104, the predictor 114 in each node 12 adjusts the length limit based on the collected transmission time statistics so that maximum transmission times of all nodes converge to the same value when the network load is high and increase when network load is light. The packet shaper 110 is further optimized to consider the rate constraint of the node in which it operates. Thus, in adjusting the length limit, the packet shaper 110 ensures that a minimum rate guarantee for the node is achieved.

The goal of packet shaping is to limit the maximum transmission time of each node. In the IEEE 802.11 standard, the maximum MSDU size is the same for all nodes. Thus, the low rate node may transmit longer time and take larger share of the bandwidth. It is therefore desirable to keep the same maximum transmission time limit instead of the same maximum packet size limit to ensure the fair resource sharing between the nodes with variable data rates.

Referring to FIG. 8, according to the static packet shaping mode of the static packet shaper 112 in each node 12, the nodes 12 set rate dependent maximum MSDU size limits so that the maximum transmission time of different data rates are the same or approximately the same (step 130). An example of rate dependent maximum MSDU limits for static packet shaping is shown in Table 1 below.

TABLE 1

| PHY Rate | Maximum MSDU |
|----------|--------------|
| 54 Mbps  | 4096 Bytes   |
| 48 Mbps  | 3640 Bytes   |
| 36 Mbps  | 2730 Bytes   |
| 24 Mbps  | 1820 Bytes   |
| 18 Mbps  | 1360 Bytes   |
| 12 Mbps  | 910 Bytes    |
| 9 Mbps   | 680 Bytes    |
| 6 Mbps   | 450 Bytes    |

For an "adaptive" mode of operation, the packet shaping is dynamically adjustable according to a node's throughput requirement and the network traffic condition. Thus, to initiate the adaptive mode, the static shaper 112 invokes the predictor 114 to dynamically adjust the maximum MSDU size limit to a current value (step 132).

Figure 9:
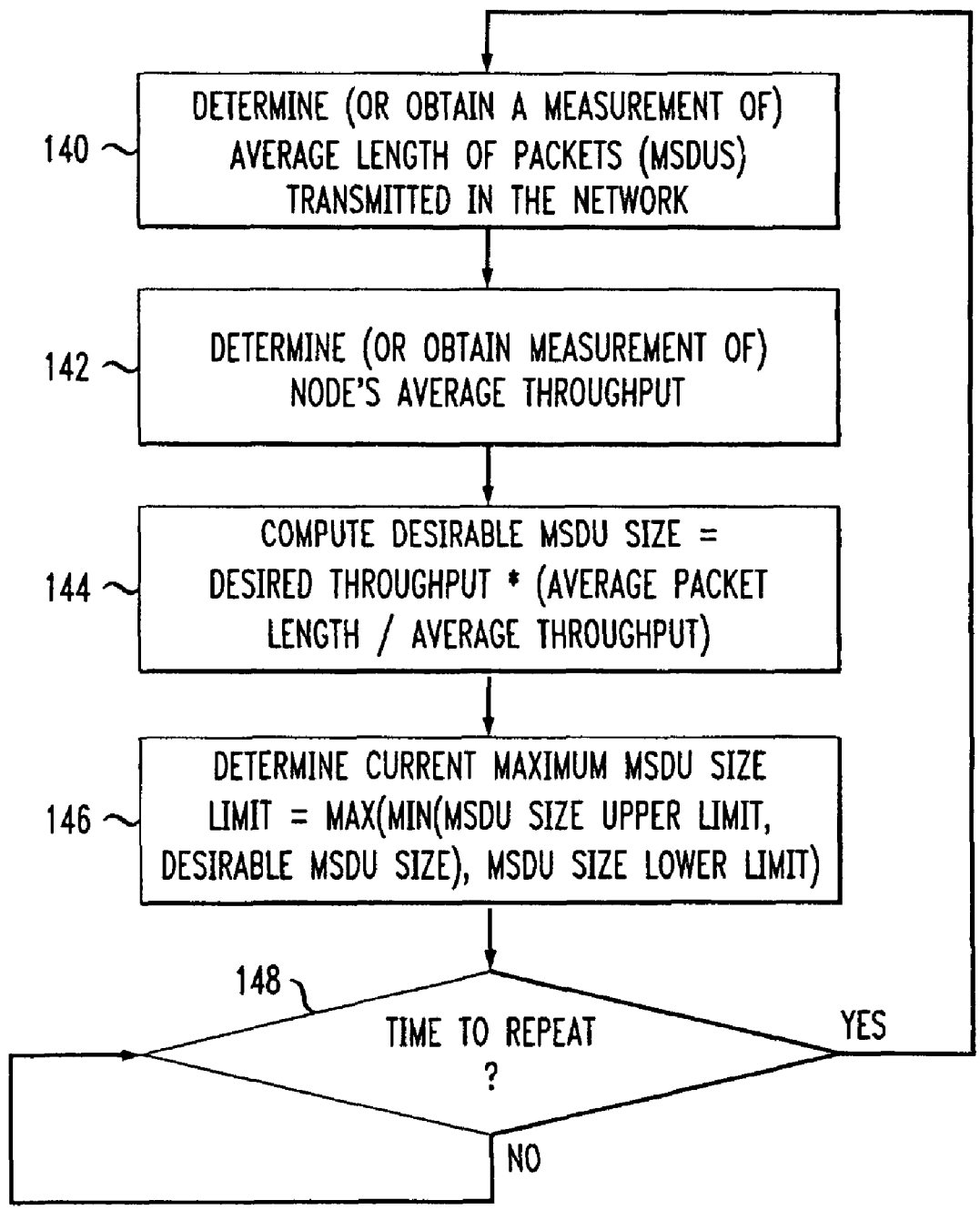
FIG. 9 is a flow diagram of the operational flow of a maximum MSDU size limit predictor (of the packet shaping controller shown in FIG. 4) to dynamically adjust the maximum MSDU size limit.

Referring to FIG. 9, the operational details of the predictor 114 are shown. The predictor 114 allows the maximum MSDU size limit to be tuned dynamically between its allowable range, i.e., the maximum and minimum limits for the MSDU size (control parameters 120, 122). The predictor 114 determines a current maximum MDSU size limit according to such inputs as the PHY (data) rate 116, desired throughput 118, the maximum limit 120 and minimum limit 122, and transmission time statistics 128. In particular, the predictor obtains statistics of the length of all the packets transmitted in the network and computes the distribution of packet length or, more specifically, in one embodiment, the average packet length (step 140), and determines the node's average throughput (step 142). In step 144, the predictor 114 computes the desirable MDSU size according to Eq. (8) below.

$$\text{desirable MSDU size} = \text{desired throughput} * (\text{the average packet length} / \text{average throughput}) \quad \text{Eq. (8)}$$

In step 146, the predictor 114 determines the current maximum MSDU size limit according to the Eq. (9) below.

$$\text{maximum MSDU limit} = \max(\min(\text{MSDU size upper limit}, \text{desirable MSDU size}), \text{MSDU size lower limit}) \quad \text{Eq. (9)}$$

In Eq. (9), the MSDU size upper limit corresponds to the maximum MSDU size limit set in step 130 of FIG. 8 (based on PHY data rate) and the MSDU size lower limit corresponds to the minimum MSDU size limit based the desired throughput (data rate constraint).

An example of maximum MSDU size limit range of dynamic packet shaping is shown in Table 2 below.

TABLE 2

| PHY Rate | Maximum MSDU Size Limit | Minimum MSDU Size Limit |
|----------|-------------------------|-------------------------|
| 54 Mbps  | 4096 Bytes              | 2400 Bytes              |
| 48 Mbps  | 3640 Bytes              | 2000 Bytes              |
| 36 Mbps  | 2730 Bytes              | 1600 Bytes              |
| 24 Mbps  | 1820 Bytes              | 1200 Bytes              |
| 18 Mbps  | 1360 Bytes              | 800 Bytes               |
| 12 Mbps  | 910 Bytes               | 600 Bytes               |
| 9 Mbps   | 680 Bytes               | 500 Bytes               |
| 6 Mbps   | 450 Bytes               | 350 Bytes               |

The predictor 114 can be configured to repeat execution whenever a predetermined timeout occurs (step 148), or in some other manner, e.g., in response to a particular event.

Figure 10:
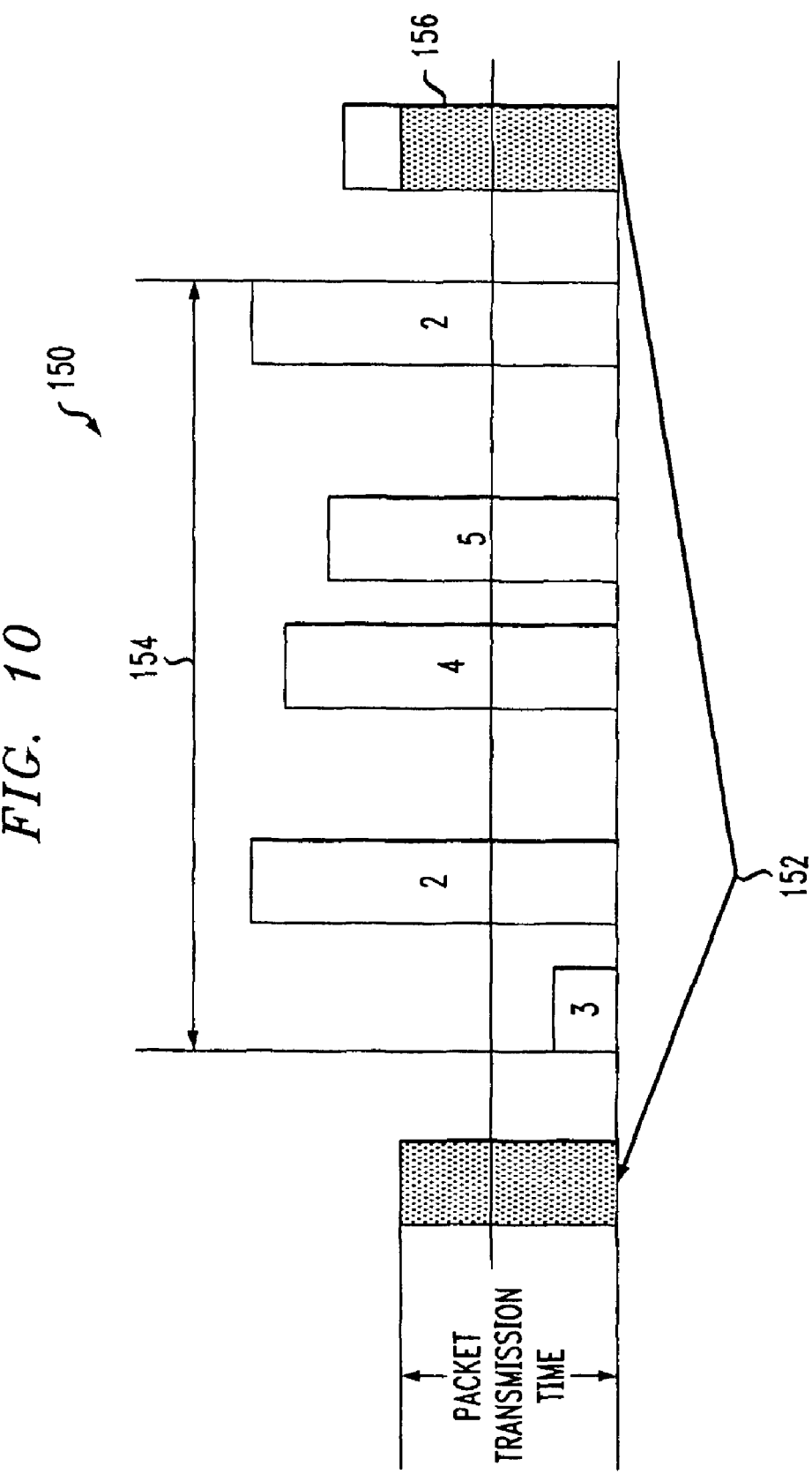
FIG. 10 is a depiction of consecutive transmissions of a network node of the wireless network.

FIG. 10 illustrates the impact of packet shaping on node transmissions 150, in particular, on consecutive transmission times of a particular node of interest (node 1) 152 separated by transmissions of other nodes (nodes 2 through 5) 154. The shaded portion of the node 1 transmission time 156 indicates an initial transmission time and the unshaded portion indicates the increase in transmission time due to packet shaping.

Although the packet shaping process has been described within the context of a network in which two or more of the nodes operate at different data rates, the process can also be applied to nodes of a network having a uniform data rate but different rate requirements for the nodes. Thus, it could still provide different rates to same data rate nodes by adjusting the length limit in the manner described above.

In effect, by changing the maximum MDSU limit, the packet shaper 110 forces the logical link sublayer to send down MSDUs to MAC sublayer at different size limits. It is also possible, however, to take modify the MAC fragmentation mechanism to achieve the packet shaping by controlling the MPDU size, i.e. the MAC fragmentation threshold.

As mentioned above, the MAC block 24 supports the process of partitioning MSDUs into smaller fragments, referred to as fragmentation. Fragmentation improves chances of frame delivery during poor channel conditions. An MSDU arriving at the MAC block 24 is placed in one or more fragments depending on the size of the MSDU and the data rate the channel will sustain. Every effort is made to transmit all of the fragments of a single MSDU in a single, continuous burst of frames. Acknowledgments and retransmissions occur independently for each fragment.

Figure 11:
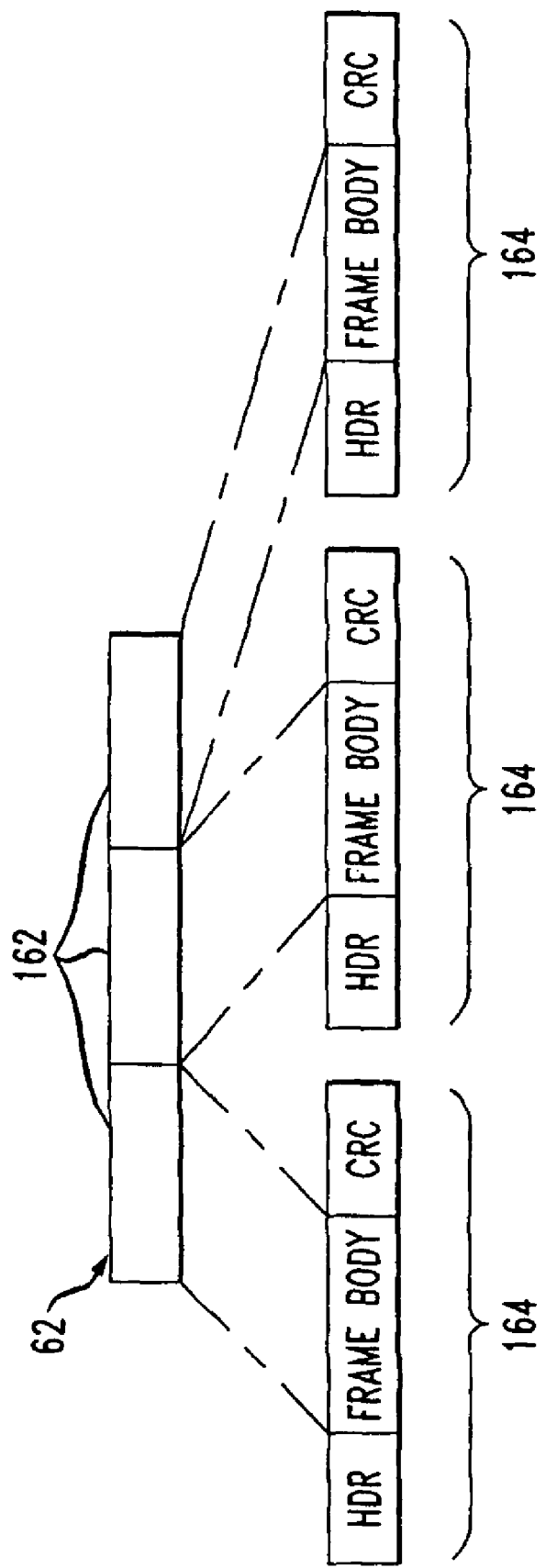
FIG. 11 is a depiction of MSDU fragmentation.

FIG. 11 illustrates a fragmentation mechanism 160 in which an MSDU 60 is partitioned into multiple MDSU portions 162. The multiple MSDU portions 162 are encapsulated in multiple frame fragments 164.

Figure 12A:
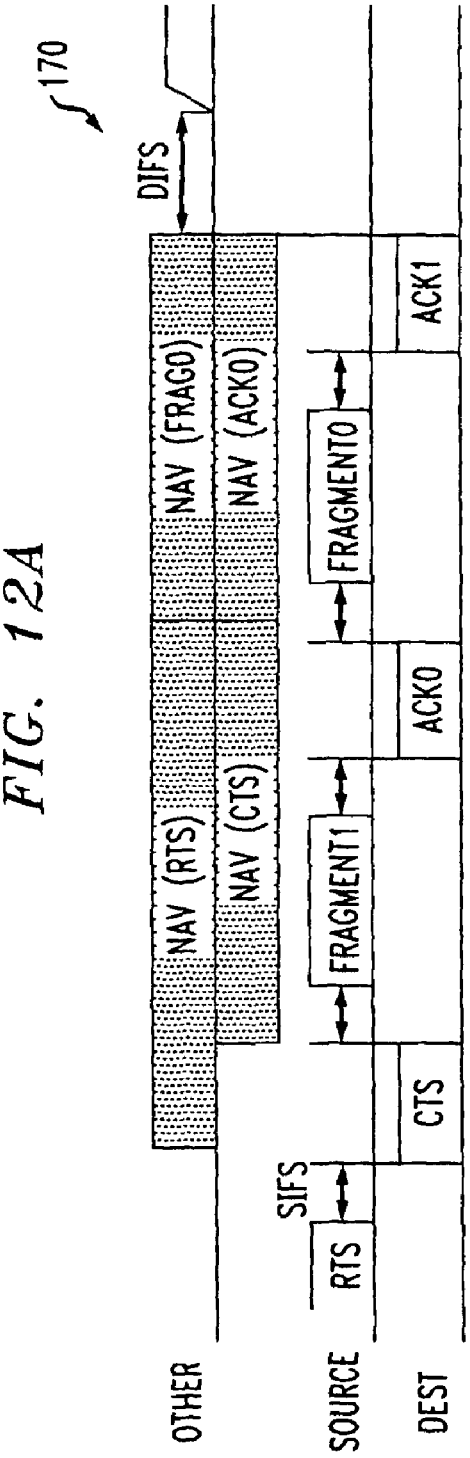
FIGS. 12A and 12B are timing diagrams illustrating successful fragment transmission and failed fragment transmission, respectively.
Figure 12B:
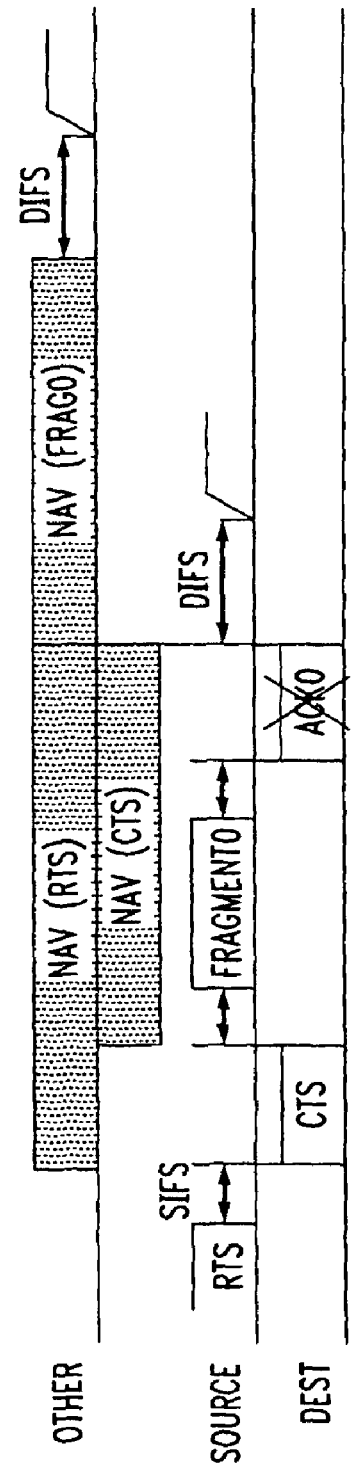

FIG. 12A shows a standard (successful) MAC fragment transmission 170 in which fragments transmit consecutively, with each fragment separately acknowledged. FIG. 12B shows a failed fragment transmission 180. As shown in FIG. 12B, during fragment is in error, the transmitting node has to contend for the channel again and retransmit that fragment.

To achieve packet shaping, and referring to FIG. 7 in conjunction with FIGS. 12A-12B, the fragmentation mechanism of the MAC block 24 (more specifically, the MAC processing unit 100) is modified so that it does not transmit the fragments sequentially as illustrated in FIG. 12A. It still partitions the MSDU into fragments according to the fragment size 128 stored in the control memory 104, but controls channel access and transmit operations to transmit only one fragment for each channel contention. Transmission of fragments is controlled so that the fragments are transmitted separately instead of sequentially. That is, to transmit another fragment, the MAC block 24 must again contend for access as it does after the failed fragment transmission shown in FIG. 12B. The MAC block in the receiving node stores each received fragment and assembles the whole MSDU after all of the fragments are received. In this manner, a transmitting node effectively limits the maximum MSDU size to the size of the fragment size (that is, the fragmentation threshold).

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. In a wireless network of nodes, a method of shaping data packets for transmission by a node comprises:
    dynamically adjusting a fragmentation threshold based on changes in network activity;
    partitioning MSDUs into fragments based on a the fragmentation threshold;
    controlling transmission of the fragments so that maximum transmission time for data packet transmission by each of the nodes is approximately the same; and
    transmitting packets from the nodes in accordance with the controlling of transmission;
    wherein the step of controlling transmission comprises controlling standard successful transmissions of the fragments so that the fragments are transmitted separately instead of sequentially.

2. The method of claim 1 wherein the step of dynamically adjusting the fragmentation threshold comprises:
    monitoring the network for on-going traffic of all nodes; and
    obtaining transmission time statistics for the on-going traffic.

3. The method of claim 1 wherein the step of controlling standard successful transmissions further comprises:
    controlling the standard successful transmissions of the fragments so that only one fragment is transmitted for each channel contention.

4. The method of claim 1, further comprising the step of:
    assembling the MSDU at a receiving node.

5. In a wireless network of nodes, an apparatus for use in a node to shape data packets for transmission comprising:
    means for partitioning MSDUs into fragments based on a fragmentation threshold;
    a controller to control at least standard successful transmissions of the fragments so that maximum transmission time for standard successful transmissions of data packets by each of the nodes is approximately the same; and
    an RF transceiver for transmitting packets from the nodes in accordance with the controller;
    wherein the controller operates to control the standard successful transmissions of the fragments so that the fragments are transmitted separately instead of sequentially; and
    wherein the controller further monitors changes in network activity for dynamically adjusting the fragmentation threshold.

6. In a wireless network of nodes, a method of shaping data packets for transmission by a node comprises:
    dynamically adjusting a fragmentation threshold based on changes in network activity;
    partitioning MSDUs into fragments based on a the fragmentation threshold;
    controlling transmission of the fragments so that maximum transmission time for data packet transmission by each of the nodes is approximately the same; and
    transmitting packets from the nodes in accordance with the controlling of transmission;
    wherein the step of controlling transmission comprises controlling standard successful transmissions of the fragments so that only one fragment is transmitted for each channel contention.

7. The method of claim 6, further comprising the step of:
    assembling the MSDU at a receiving node.

* * * * *